(12) United States Patent
Takaoka et al.

(10) Patent No.: US 8,747,961 B2
(45) Date of Patent: Jun. 10, 2014

(54) PROCESS FOR PRODUCTION OF ELECTRET MATERIAL

(75) Inventors: Seiichi Takaoka, Osaka (JP); Kumie Yamana, Osaka (JP)

(73) Assignee: Nitto Denko Corporation, Osaka (JP)

( * ) Notice: Subject to any disclaimer, the term of this patent is extended or adjusted under 35 U.S.C. 154(b) by 144 days.

(21) Appl. No.: 13/131,723

(22) PCT Filed: Apr. 13, 2010

(86) PCT No.: PCT/JP2010/056609
§ 371 (c)(1),
(2), (4) Date: May 27, 2011

(87) PCT Pub. No.: WO2010/119869
PCT Pub. Date: Oct. 21, 2010

(65) Prior Publication Data
US 2011/0229655 A1  Sep. 22, 2011

(30) Foreign Application Priority Data
Apr. 14, 2009 (JP) .................................. 2009-097753

(51) Int. Cl.
B05D 3/00 (2006.01)
H05H 1/24 (2006.01)
H05B 6/00 (2006.01)
H05H 1/00 (2006.01)

(52) U.S. Cl.
USPC ............ 427/561; 427/595; 427/569; 427/535

(58) Field of Classification Search
None
See application file for complete search history.

(56) References Cited

U.S. PATENT DOCUMENTS

| | | |
|---|---|---|
| 2006/0188728 A1 | 8/2006 | Kawato et al. |
| 2006/0218785 A1 | 10/2006 | Horiuchi et al. |
| 2007/0160247 A1* | 7/2007 | Makihata et al. ............ 381/355 |

FOREIGN PATENT DOCUMENTS

| | | |
|---|---|---|
| CN | 1880370 A | 12/2006 |
| JP | 64-44010 A | 2/1989 |
| JP | 11-150795 A | 6/1999 |
| JP | 2000-115895 A | 4/2000 |
| JP | 2000115895 * | 4/2000 |
| JP | 2005-45553 A | 2/2005 |
| JP | 2006-63140 A | 3/2006 |
| JP | 2006-287279 A | 10/2006 |
| JP | 2007-314645 A | 12/2007 |
| JP | 2009-267649 A | 11/2009 |

OTHER PUBLICATIONS

A. A. Koptelov, "The Kinetics of Crystallization of Poly(tetrafluoroethylene) by the Action of g-Radiation", High Energy Chemistry, vol. 37, No. 3, 2003, pp. 151-156.*
International Search Report for PCT/JP2010/056609 dated Jun. 22, 2010 [PCT/ISA/210].
Written Opinion for PCT/JP2010/056609 dated Jun. 22, 2010 [PCT/ISA/237].
Office Action dated Jul. 31, 2012 issued by the State Intellectual Property Office of the People's Republic of China in counterpart Chinese Application No. 201080003427.7.
Office Action, dated Sep. 17, 2013, issued by the Japanese Patent Office, in counterpart Application No. 2010-091083.

* cited by examiner

*Primary Examiner* — Timothy Meeks
*Assistant Examiner* — Ina Agaj
(74) *Attorney, Agent, or Firm* — Sughrue Mion, PLLC

(57) ABSTRACT

Provided is a process by which an electret material having excellent thermal resistance of charge retentivity can be obtained. The process for producing an electret material of the invention includes an irradiation step, a formation step, and a charging step. In the irradiation step, a dispersion containing fine polytetrafluoroethylene particles is irradiated with γ rays. In the formation step, the dispersion which has been irradiated with γ rays is applied to an electrode plate and then dried, and the fine polytetrafluoroethylene particles are sintered to form a polytetrafluoroethylene layer on the electrode plate. In the charging step, the surface of the polytetrafluoroethylene layer is subjected to a charging treatment.

2 Claims, No Drawings

PROCESS FOR PRODUCTION OF ELECTRET MATERIAL

TECHNICAL FIELD

The present invention relates to a process for producing an electret material for use in electrostatic acoustic transducers.

BACKGROUND ART

An electret material including an electrode plate and an electret layer formed thereon has conventionally been used in electrostatic acoustic transducers such as earphones, headphones, and microphones. For example, in an electret capacitor microphone (ECM) having a built-in IC (integrated circuit) element, an electret material is disposed so as to face the front-side or back-side surface of a diaphragm.

Various processes for producing such an electret material have been proposed. For example, Patent document 1 describes a process in which a thermoplastic-resin film capable of constituting an electret layer is laminated to a metal sheet and the film is converted to an electret. Patent document 2 and Patent document 3 describe a process in which a dispersion including a dispersion medium and fine particles of an FEP (specifically, a tetrafluoroethylene/hexafluoropropylene copolymer) dispersed therein is applied to a back electrode plate and heated to thereby form a thin film and this thin film is converted to an electret.

BACKGROUND ART DOCUMENT

Patent Documents

Patent Document 1: JP-A-64-44010
Patent Document 2: JP-A-11-150795
Patent Document 3: JP-A-2000-115895

SUMMARY OF THE INVENTION

Problems that the Invention is to Solve

Incidentally, there are cases where an electrostatic acoustic transducer is mounted on, for example, a control board or the like by soldering using a flow device or reflow device. However, in the case where electret materials obtained by conventional production processes are used, there has been a problem that the mounting of the electrostatic acoustic transducer results in a decrease in the amount of electric charges possessed by the electret material. This is thought to be attributable to a decrease in the surface potential of the electret layer which is due to the heating of the electret layer to a high temperature during the soldering. As a result of the frequent use of lead-free solders especially recently, higher temperatures have come to be used for soldering, and there is hence a possibility that the amount of charges possessed by the electret material might decrease considerably.

An object of the invention is to provide, under these circumstances, a production process by which an electret material having excellent charge retentivity against heat can be obtained.

Means for Solving the Problem

The invention provides a process for producing an electret material for use in electrostatic acoustic transducers, the process including: a step of irradiating a dispersion containing fine polytetrafluoroethylene particles with γ ray; a step of applying the dispersion to an electrode plate, followed by drying, and further sintering the fine polytetrafluoroethylene particles, thereby forming a polytetrafluoroethylene layer on the electrode plate; and a step of subjecting a surface of the polytetrafluoroethylene layer to a charging treatment.

Advantage of the Invention

According to the above-mentioned process, the irradiation of the dispersion as a starting material with γ ray causes slight degradation to reduce the molecular weight, thereby improving the crystallinity of the polytetrafluoroethylene layer. Because of this, the electret layer including the polytetrafluoroethylene layer is inhibited from decreasing in surface potential even when heated to a high temperature. Consequently, an electret material having excellent charge retentivity against heat can be obtained according to the invention.

MODE FOR CARRYING OUT THE INVENTION

The process for producing an electret material of the invention includes an irradiation step, a formation step and a charging step.

(Irradiation Step)

In the irradiation step, a dispersion including a dispersion medium and fine particles of polytetrafluoroethylene (hereinafter referred to as "PTFE") dispersed therein is irradiated with γ ray to modify the dispersion with the γ ray.

The dispersion including a dispersion medium and fine PTFE particles dispersed therein preferably is a dispersion in which water is used as the dispersion medium. Various commercial products of such a dispersion which were produced by emulsion polymerization are on the market, and these commercial products can be utilized. For example, Polyflon D-1 manufactured by Daikin Industries, Ltd., Fluon AD911L manufactured by Asahi Glass Co., Ltd., or the like may be used.

It is preferred that the dispersion should have a specific gravity of 1.2 to 1.6. In the case where a commercial product is utilized as the dispersion, the specific gravity of the commercial product may be regulated by adding distilled water thereto. The specific gravity of the dispersion is more preferably 1.2 to 1.5, even more preferably 1.3 to 1.5.

The irradiation of the dispersion with γ ray may be entrusted, for example, to a trastee radiational processor. Such trastee radiational processors include Radia Industry Co., Ltd. and Japan Irradiation Service Co., Ltd.

It is preferred that the dispersion should be irradiated with γ ray emitted from cobalt-60.

The exposure dose of γ ray to the dispersion is preferably from 100 to 3,000 Gy. This is because in case where the exposure dose of γ ray is less than 100 Gy or is more than 3,000 Gy, the electret layer, when heated to a high temperature, undergoes a slightly larger decrease in surface potential. The exposure dose of γ ray is more preferably from 500 to 3,000 Gy, further preferably from 500 to 2,000 Gy.

(Formation Step)

In the formation step, the dispersion modified with γ ray is used to form a PTFE layer on an electrode plate. Specifically, the dispersion is applied to an electrode plate and then dried, and the fine PTFE particles are sintered.

As the electrode plate, metal plates made of stainless steel, aluminum, steel, copper, titanium and alloys thereof may be used. Alternatively, the electrode plate may be a metal foil supported on, for example, a substrate. Namely, the electrode plate in the invention may be any thin metallic plate, and the thickness thereof is not particularly limited. However, from the standpoint of the requirement for size reduction in electret materials, it is preferred that the thickness of the electrode plate is 100 to 300 μm.

It is preferred that the electrode plate is free from adherent fats and oils, etc. It is preferred that the electrode plate is subjected to surface preparation in order to improve adhesion to the PTFE layer. Although the surface preparation is not particularly limited, it is preferred to conduct a treatment which does not enhance the surface roughness of the electrode plate, such as, for example, coating film formation by either anodization or a chemical treatment, from the standpoint of attaining thickness evenness and surface smoothness of the PTFE layer.

For applying the dispersion to the electrode plate, a known technique can be used. For example, the dispersion may be applied using a dispenser, or may be applied by spin coating or a printing technique. Alternatively, a method in which one surface of the electrode plate is masked and this electrode plate is immersed (dipped) in the dispersion to thereby apply the dispersion to the electrode plate may be used.

After the dispersion has been applied to the electrode plate, the dispersion is dried in order to remove the dispersion medium from the dispersion. The drying is conducted, for example, by placing the dispersion-coated electrode plate in an environment having a temperature (e.g., 180° C.) lower than the melting point of the PTFE for a given time period (e.g., 10 minutes).

Thereafter, the fine PTFE particles are sintered. The sintering is conducted, for example, by a method in which the electrode plate on which the dried dispersion (fine PTFE particles) is supported is placed in an environment having a temperature not lower than the melting point of the PTFE for a given time period (e.g., 10 minutes). Thus, a PTFE layer is formed on the electrode plate. It is preferred that the temperature during the sintering is 340° C. or higher (e.g., 360° C.). After the sintering, the electrode plate is cooled to room temperature.

It is preferred that the PTFE layer to be formed has a thickness of from 5 to 100 μm. This is because so long as the thickness of the PTFE layer is within that range, the electret material can be reduced in thickness and size while maintaining the characteristics of the electret material. The thickness of the PTFE layer is more preferably from 10 to 50 μm.

(Charging Step)

In the charging step, the surface of the PTFE layer is subjected to a charging treatment to convert the PTFE layer into an electret layer. The charging treatment is conducted by polarizing and charging the surface of the PTFE layer by, for example, a corona discharge or the like.

In the case of mass-production, a plurality of electret materials may be produced by a method in which the steps up to the formation step are conducted inclusively for the multiple electret materials and the PTFE-coated electrode plate is cut into the size of individual pieces before the charging step. Furthermore, aging may be conducted after the charging step.

Through the steps described above, an electret material having excellent charge retentivity against heat can be obtained.

It is desirable that from the standpoint of enabling the electret material to retain a large amount of charges even at high temperatures, charge trap sites should be maintained at temperatures up to around the melting point of the PTFE constituting the electret layer. Specific trap sites are thought to be crystal defects within the PTFE crystals and the interface between the crystalline part and the noncrystalline part.

General PTFE films are produced by subjecting fine PTFE particles to a compression molding step and a sintering step and then slicing the sintered object into films. Because of this, voids are apt to be formed during the film production and the voids are causative of stress relaxation at high temperatures and apt to cause crystal fluidization. As a result, charge trap sites (e.g., the interface between the crystalline part and the noncrystalline part) are destroyed and the amount of charges possessed by the electret material decreases.

In contrast, in the electret material produced by the production process of the invention, the PTFE layer has improved crystallinity because the molecular weight thereof was reduced through slight degradation by irradiation of the dispersion as a staring material with γ-ray. The PTFE layer hence has an increased amount of the interface between the crystalline part and the noncrystalline part and further has an increased amount of crystal defects within the PTFE crystals. Consequently, the charge trap sites can be maintained even when the electret layer is heated to a high temperature. The amount of charges possessed by the electret material can hence be kept large even at high temperatures.

Furthermore, by employing PTFE as the material of the electret layer, excellent functions such as antifouling properties, chemical resistance, water repellency, and weatherability can be imparted to the surface of the electret material without impairing the flexibility of the electret material. In addition, the electret material can be relatively easily subjected to processing into a given shape (e.g., punching), etc.

EXAMPLES

The invention will be explained below in detail by reference to Examples, but the invention should not be construed as being limited to the following Examples in any way.

Example 1

Distilled water was added to a commercial PTFE dispersion (Fluon AD911L, manufactured by Asahi Glass Co., Ltd. (solid concentration, 60 wt %)) to produce a dispersion having a specific gravity of 1.50. This dispersion was irradiated with γ ray so that the exposure dose thereof becomes 100 Gy.

Thereafter, a commercial aluminum foil having a thickness of 200 μm (manufactured by Toyo Aluminium K.K.; flexible foil with roughened surface) was used as an electrode plate, and one surface of this electrode plate was masked with a pressure-sensitive adhesive masking tape. This electrode plate was passed through the γ-ray-modified dispersion at a dipping rate of 100 mm/min to apply the dispersion to the other surface of the electrode plate. Subsequently, the electrode plate was placed in a 180° C. environment for 10 minutes to dry the dispersion, and the pressure-sensitive adhesive masking tape was then removed. Thereafter, the electrode plate was placed in a 360° C. environment for 10 minutes to sinter the fine PTFE particles. Thus, a PTFE layer having a thickness of 25 μm was formed on the electrode plate having a thickness of 200 μm. After the sintering, the electrode plate was cooled to room temperature.

Finally, the surface of the PTFE layer was polarized and charged at 25° C. by a minus corona discharge. Thus, an electret material was obtained.

Example 2

An electret material was obtained in the same manner as in Example 1, except that the exposure dose of γ ray to the dispersion was 500 Gy.

Example 3

An electret material was obtained in the same manner as in Example 1, except that the exposure dose of γ ray to the dispersion was 3,000 Gy.

Example 4

An electret material was obtained in the same manner as in Example 1, except that the exposure dose of γ ray to the dispersion was 10,000 Gy.

Comparative Example 1

A commercial PTFE film having a thickness of 25 μm (No. 900-UL, manufactured by Nitto Denko Corp.) was press-bonded with heating to a commercial aluminum foil having a thickness of 200 μm (manufactured by Toyo Aluminium K.K.; flexible foil with roughened surface) using a hot press (temperature, 360° C.; pressure, 490 kPa). Thereafter, the surface of the PTFE film was polarized and charged at 25° C. by a minus corona discharge. Thus, an electret material was obtained.

Comparative Example 2

An electret material was obtained in the same manner as in Example 1, except that the dispersion was not irradiated with γ rays.

(Test)

The electret materials of the Examples and Comparative Examples were examined for the retention of electret-layer surface potential in the following manner.

First, the surface potential of the electret layer immediately after the charging treatment was measured with a surface potential meter (Model 244, manufactured by MONROE ELECTRONICS, Inc.). Subsequently, the electret material was placed in a 210° C. environment for 30 minutes (loading test), and the surface potential of the electret material was thereafter measured in the same manner. This operation was repeated three times. The proportion of the surface potential measured after each of the first to the third loading tests to the surface potential of the electret material measured immediately after the charging treatment as a reference (100%) was calculated as a retention of surface potential (%).

Furthermore, the electret materials of the Examples and Comparative Examples were examined for the pencil hardness of the electret layer in accordance with JIS K5600-5-4.

The results of the tests are shown in Table 1.

TABLE 1

|  | Retention of surface potential after loading test (%) | | | Pencil hardness |
|---|---|---|---|---|
|  | First | Second | Third |  |
| Example 1 | 90 | 85 | 81 | 2H |
| Example 2 | 92 | 87 | 86 | 2H |
| Example 3 | 86 | 81 | 77 | 2H |
| Example 4 | 84 | 80 | 74 | B |
| Comparative Example 1 | 28 | 24 | 23 | 2H |
| Comparative Example 2 | 39 | 32 | 30 | 2H |

As apparent also from Table 1, the electret material of Comparative Example 1 in which a PTFE film had been used, and the electret material of Comparative Example 2 in which the dispersion had not been modified with ray, had a retention of surface potential that had decreased already to below 40% after the first loading test. In contrast, the electret materials of the Examples in which the dispersion had been modified with γ ray, retained an exceedingly high retention of surface potential even after the third loading test.

Incidentally, it is presumed that exposure dose of γ ray exceeding 10,000 Gy result in an electret layer which has a pencil hardness lower than B and is hence unpractical. It is therefore preferred that the exposure dose of γ ray is 10,000 Gy or less.

This application is based on a Japanese patent application filed on Apr. 14, 2009 (Application No. 2009-097753), the contents thereof being incorporated herein by reference.

INDUSTRIAL APPLICABILITY

The electret material obtained by the production process of the invention is suitable for use in electrostatic acoustic transducers. The electrostatic acoustic transducers include hearing aids, ultrasonic sensors, acceleration sensors, and the like besides microphones, earphones, and headphones.

The invention claimed is:

1. A process for producing an electret material for use in electrostatic acoustic transducers, the process comprising:
    a step of irradiating a dispersion containing fine polytetrafluoroethylene particles with γ ray;
    a step of applying the irradiated dispersion to an electrode plate, followed by drying, and further sintering the fine polytetrafluoroethylene particles, thereby forming a polytetrafluoroethylene layer on the electrode plate; and
    a step of subjecting a surface of the polytetrafluoroethylene layer to a charging treatment,
    wherein an exposure dose of the γ ray is from 100 Gy to 3,000 Gy.

2. The process for producing an electret material according to claim 1, wherein the polytetrafluoroethylene layer has a thickness of from 5 μm to 100 μm.

* * * * *